// United States Patent [15] 3,701,118
O'Connor [45] Oct. 24, 1972

[54] OPTICAL STORAGE MEDIUM & METHOD OF MAKING & USING

[72] Inventor: James E. O'Connor, Dayton, Ohio
[73] Assignee: The National Cash Register Company, Dayton, Ohio

[22] Filed: July 23, 1971
[21] Appl. No.: 165,710

Related U.S. Application Data

[63] Continuation-in-part of Ser. No. 72,235, Sept. 14, 1970.

[52] U.S. Cl. ...340/173 LS, 340/173 R, 340/173 CC, 340/173 LM, 117/36.7, 117/130, 346/1, 346/135
[51] Int. Cl. ............................................G11c 13/04
[58] Field of Search.....340/173 R, 173 CC, 173 LM, 340/173 LS; 117/36.7, 130; 346/134, 135

[56] References Cited

UNITED STATES PATENTS 3,568,167 3/1971 Carson ......................340/173

*Primary Examiner*—Terrell W. Fears
*Attorney*—Joseph Patrick Burke et al.

[57] ABSTRACT

This disclosure is directed to a reversible, yet optionally permanent dual electro-optical record and storage medium, bistable in both the optical and electrical modes and non-volatile in the electrical mode having high resistivity contrast in the electrical mode between the write and erase states, high resolution and contrast in the optical mode between the write and erase states, high resolution and contrast in the optical mode between the write and erase states. The record medium can be used for display purposes and is capable of high bitpacking density and thermal microrecording and erasure and comprises a fired ceramic glaze containing an intimate mixture of reducible lead oxide and reducible copper oxide as a major component and silica and alumina as minor components and wherein the mole ratio of lead (as lead oxide) to copper (as copper oxide) can range from about 0.1 to about 12.0:1. Magnesia can be included in said glaze as a minor component.

14 Claims, No Drawings

OPTICAL STORAGE MEDIUM & METHOD OF MAKING & USING

This application is a continuation-in-part of U.S. Ser. No. 72,235, filed Sept. 14, 1970, by James E. O'Connor and entitled "ARTICLE AND METHOD".

The present invention was occasioned by a need for a high capacity record medium for storage of information wherein the storage medium is not susceptible to environmental influences of temperature, humidity, etc. Moreover, the desired record medium would be rugged, long-lived and inexpensive and require no special environmental atmosphere for its successful operation either in the write, storage, or erase states. A further requisite property of such record medium is that it be capable of optionally permanent storage or erasure and be non-volatile (viz., not require the maintenance of an energy form, e.g., electrical, in order to accomplish storage). Moreover, it is desired that the record medium sought possess sufficient resistance to fatigue upon repeated write-erase-write cycles and during storage between such cycles so as to enable extended usage and storage without need for replacement thereof. A still further objective in such a medium is the ability to write and erase at different energy levels so as to render the record medium less susceptible to introduction of errors.

Glass materials containing lead oxide are disclosed in the prior art, which materials are reported to be capable of being made clear or black by proper heat treatment. One representative prior art patent of this type is U.S. Pat. No. 2,353,354 to Nordberg, which discloses that certain glasses containing silica, alkali metal oxide, lead oxide, and tin oxide when melted reducingly through the addition of a reducing agent can be made either clear or black (opaque) by proper heat treatment. Such glasses require differential heating or cooling to produce in selected areas thereof portions which are of contrasting color, e.g., black on clear, or clear on black. Such articles require extended time for heating and are not disclosed as suitable to record or store electrical information or possess the ability of having a substantial difference in resistivity in the written and erased states.

U.S. Pat. No. 3,354,064 to Letter describes lead fluorosilicate glasses, e.g., those which contain silica, lead oxide and lead fluoride and which are capable of producing relatively opaque color when subjected to electron bombardment which can be focused in certain regions thereof. Areas on which no writing is to appear can be protected by shields or masked to prevent the imposition of the opaque color therein. The color thus imposed is stated to be permanent or reversible according to the sequence of thermal treatment or exposure to the electron bombardment. Thus, erasure can be secured within reasonable erasure times only by heating said glass whereas the writing requires the imposition of the electron radiation. While the patentee states that the energy requirements are relatively low for the "write" capability, the exposure to electromagnetic radiation can present certain health hazards and even in the low level energy can require the use of voltages in the range of 100 to 600 volts which can increase the expense of the writing cycle.

A different approach to the problem is offered by Schreiber, U.S. Pat. No. 3,323,244 which utilizes phototropic glass for dynamic displays. According to the Schreiber patent, dynamic displays can be provided in phototropic glass compositions chosen so that optical transmittance of visible light is variable with the intensity of electromagnetic radiation (visible light) projected on the glass to produce therein comparatively opaque regions. Hence, the writing is done by electromagnetic radiation and upon removal thereof the darkened areas eventually become light. The erasure can be accelerated by heating the exposed areas. There is no disclosure of a record medium having the ability to produce write-erase states having substantially different electrical resistivity; nor is there any indication that the written information can be stored. Of course, storage ability would appear to be directly opposite to the desired objectives of dynamic displays indicated by Schreiber.

Other glass record media are known which possess tenebrescence, viz., that property of material of reversibly darkening and bleaching under suitable radiation. For example, U.S. Pat. No. 3,253,497 to Dreyer teaches an information storage system having a tenebrescent storage unit utilizing scotophor materials, e.g., Hackmanite, NaCl $(NaA1SiO_4)_3$, which is stated to display a raspberry red color when activated by ultraviolet light. The writing can be conducted by subjecting the glass containing the Hackmanite to other forms of high energy, for example, X-rays, alpha particles, gamma rays, Cathode rays, etc., and the like. Erasure can be accomplished by radiation with short wave lengths, e.g., radiation of the colored scotophor with a wave length which is maximally absorbed by the colored scotophor. An elaborate system is disclosed for writing, scanning (reading) and erasing based upon an optical information storage device. Dreyer fails to disclose a record and storage medium capable of distinguishing by significantly different electrical resistivity between the "write" and "erase" states, respectively. A wide variety of tenebrescent materials are disclosed including various metal halides and metal oxides, but nowhere does Dreyer disclose the combination of lead oxide and copper oxide in a ceramic record medium of the type contemplated in accordance with this invention.

The dual electro-optical record and storage medium of this invention is comprised of a fired ceramic glaze containing an intimate mixture of reducible lead oxide and reducible copper oxide as a major component and silica and alumina as minor components wherein the mole ratio of lead (as lead oxide) to copper (as copper oxide) can range from about 0.1 to about 12.0:1. The concentration of copper can exceed and greatly exceed that of lead in the glaze layer. The aforementioned mixtures can thus contain a predominant concentration of either lead or copper. Usually, however, the concentration of lead (as lead oxide) exceeds that of copper (as copper oxide), e.g., on a mole ratio-basis of about 0.25 to 5:1.

The mole ratio of lead to copper can range from as low as 0.1:1 to as high as 12:1 depending on the temperatures utilized to fire the glaze upon the substrate. Thus, it has been determined that working glazes, viz., those which are capable of being switched and retain their bistable property in both the optical and electrical modes, can be prepared in the following mole ratios of lead oxide to copper oxide at the temperatures indicated in the following table:

TABLE

| Range of Mole Ratio of PbO to CuO | Temperature (° centigrade) |
|---|---|
| 4.0:1 to 0.1:1 | 1220(upper limit of furnace utilized) |
| 6.0:1 to 0.1:1 | 1150 |
| 6.0:1 to 0.1:1 | 1050 |
| 2.0:1 to 0.25:1 | 950 |
| No working glaze | Lessthan 950 |

| Range of $PbO$ to $Cu_2O$ Mole Ratio | Temperature (° centigrade) |
|---|---|
| 12.0:1 to 0.1:1 | 1220 |
| 12.0:1 to 0.1:1 | 1150 |
| 8.0:1 to 0.1:1 | 1050 |
| 4.0:1 to 1:1 | 950 |

Fatigue testing of a glaze having a $PbO$ to $Cu_2O$ mole ratio of 4.0:1 using a methane-oxygen torch over 150 cycles of writing and erasing thermally within the temperature ranges set forth herein reveals excellent uniformity and stability for the glazes. Thus, the reduced (copper-colored) state has a uniform resistivity of about 2 ohms whereas the non-conducting state has a uniform resistivity of about $10^7$ ohms.

The dual electro-optical bistable record and storage medium of this invention possesses a beneficial and unique combination of advantages and avoidance of disadvantages compared to prior art record media including some of the typical prior art patents referred to herein.

Advantages capable of attainment with this invention include sharp contrast between the write and erase states both in the optical and electrical modes; a non-volatile memory capability in the electrical mode (namely, the memory capability in the electrical mode is retained even when the energy source is turned off); the optical and electronic record media is bistable in both the optical and electronic states; viz., stable in both the write and erase states in both the optical and electrical modes; the electro-optical record medium is useful in display systems including those requiring high visual resolution capacity; the electro-optical record media can be utilized for microrecording, viz., recording and storage purposes involving indicia or data so small as to be not readily discernible by the human eye, the property of comparative inertness, ruggedness, longevity and fastness (non-fading) combined with low cost and high bit-packing density for both optical and/or electrical storage of information; the electro-optical record medium requires no special environment or reducing atmosphere for its successful operation since the reduction can be conducted quite satisfactorily in air which usually provides sufficient reducing atmosphere; the method of writing and erasing, itself, does not destroy, abraid or weaken the record medium; the record medium accommodates uniformity and reproducibility of uniformity both in the writing and erasure states and both with respect to differences in electrical resistivity and optically distinguishable colors or shades; the attainment of reasonably rapid switching times (in microsecond time intervals); the record medium displays very good fatigue resistance when repeatedly switched between the low resistivity and high resistivity states in the electrical mode giving little indication of fatigue; the record medium permits the use of readily differentiated thermal energy levels for writing and erasing thus rendering the medium less susceptible to introduction of errors; switchability in electrical resistivity can be controlled between virtually any desired limits in that the change in resistivity with temperature is in an analog relationship, e.g., like a rheostat as it is heated in a temperature-time relationship; the medium is not readily susceptible to harmful degradation by varying atmospheric temperatures and humidity conditions, thus the environment of use of the record and storage medium need not be carefully controlled as to temperature and humidity; and the medium affords optionally permanent yet erasable and reusable data storage facilities in both the optical and electrical modes. While a reducing atmosphere or environment is required; when using a butane-oxygen torch as a heat source, no extraneous reducing atmosphere is required because the reducing portion of the torch flame suffices to provide it. In certain cases, it may be desirable to provide a reducing medium, atmosphere(s) or environments(s), e.g., alcohols, such as ethanol, ketones (acetone), aldehydes (acetaldehyde), ethers, etc.

The record medium of this invention can be prepared in a variety of ways. One satisfactory method of preparation is to form a glaze comprised chiefly of lead oxide and copper oxide mixed in the mole ratios hereinbefore mentioned. According to a preferred embodiment of this invention, the mole ratio of lead oxide to copper oxide ranges from about 3 to about 4:1. One way to satisfactorily and successfully incorporate the silica, alumina and optionally (yet preferably) included magnesia, is to apply the aforementioned glaze to a magnesia-alumina-silicate substrate and the glaze can then be fired thereon at temperatures of from about 1,000° C. to about 1,400° C., and more usually temperatures of about 1,000° C. to 1,300° C., e.g., at temperatures of about 1,200° C. In the state immediately after firing of the glaze, a dark green coloration is observed throughout the area encompassed by said glaze. In this state X-ray analysis reveals the presence of copper oxide and lead with no detectable presence of metallic copper, per se. The initial fired glaze displays very high electrical resistivity, viz., from about $10^{10}$ to about $10^{12}$ ohms per square.

The term "ohms per square" is a conventional term used to measure surface resistivity and resistivity differences between surfaces and is a comparatively pure number which reflects resistivity of the surface regardless of the area thereof. Of course, the resistivity of a surface can differ along various portions or areas of this same surface.

After cooling of the fired glaze, the copper colored or "write" state can be brought about by heating the record medium, in a reducing atmosphere, at temperatures of about 600° C. to about 900° C. X-ray analysis of the record medium in this state detects the presence of copper oxide, lead and metallic copper. The "write" state of the medium displays very low resistivity, viz., from about 0.2 to 2.0 ohms per square.

Erasure of the aforementioned written medium can be accomplished by heating to temperatures of about 150° C. to about 550° C. and a blue-green color results. In the "erase" state X-ray analysis reveals the presence of copper oxide, lead and only a trace of metallic copper. As noted, the "write" state has very low resistivity, e.g., from about 0.2 to about 2.0 ohms per square. However, the "erase" state has very high resistivity, viz., from about $10^4$ to about $10^{12}$ ohms per square. This represents an order of difference of resistivity of $10^3$ to $10^{11}$ ohms per square between the "erase" and "write" states.

Additionally, it has been learned that erasure can be conducted by use of oxidizing agents without use of high temperatures, viz., at ambient room temperatures in place of the use of heat as hereinabove described. Thus, the inventor has successfully utilized from 0.1 to 1.0N aqueous weakly acid solutions of potassium permanganate, viz., 0.1 to 1.0N aqueous potassium permanganate solutions to which 3 to 4 drops of concentrated $H_2SO_4$ were added (per 20 mls. of solution). Similarly, 0.1 to 1.0N aqueous solutions of potassium dichromate acidified with very small amounts of concentrated hydrochloric acid can be used. Other oxidizing agents include: aqueous solutions of hydrogen peroxide (e.g. 50% $H_2O_2$); 0.1 to 1.0 Normal aqueous ceric ammonium sulfate etc. The ceric ammonium sulfate salt utilized has the formula: $Ce(SO_4)_2 \cdot (NH_4)_2SO_4 \cdot 2H_2O$. Other conventional oxidizing agents and mixtures thereof can be utilized in equivalent strengths.

A wide variety of silica and alumina-containing substrates can be used, including the substrates comprised mainly of silica and alumina containing some magnesia and/or other oxides. According to one preferred embodiment of this invention, the substrate contains magnesia and the mole ratios of magnesia to alumina to silica range from 1 to 3 moles of magnesia per 1 to 3 moles of alumina per 4 to 6 moles of silica, more usually from 1.5 to 2.5:1.5 to 2.5:4 to 6, and more preferably the mole ratio of magnesia to alumina to silica ranges from 1.75 to 2.25:1.75 to 2.25:4.75 to 5.25, and more preferably said mole ratio is about 2 mole parts of magnesia to about 2 mole parts of alumina to about 5 mole parts of silica. Analysis of a representative fired glaze indicates that there is some apparent migration of substrate materials to the glaze layer and vice versa. Hence, the analysis of the record medium after firing on the aforementioned magnesia-alumina-silica substrates has the following composition:

| Components: | Concentration (wt. percent): |
|---|---|
| lead | 41.5 |
| silicon | 9.3 |
| copper | 5.7 |
| aluminum | 3.4 |
| magnesium | 0.8 |
| oxygen | 39.3 (by difference) |

Thus, it will be seen that the predominant component of a preferred record medium on a weight basis is lead followed in turn by silicon, copper, aluminum, magnesium. While silica-alumina-magnesia substrates are preferably in accordance with one embodiment of this invention; a silica-magnesia-containing glaze has been formed from $MgO \cdot SiO_2$ but a similar magnesia-silica having two moles of magnesia per mole of silica failed to result in a switchable glaze. The $MgO \cdot SiO_2$ substrate formed a switchable glaze with the aforementioned lead oxide - copper oxide formulation but the glaze did not possess the uniformity possessed when using the magnesia-alumina-silicate substrate in the mole ratio specified hereinabove.

The record medium can be used supported by the substrate upon which it was formed. Alternatively, the substrate can be removed, e.g., by cutting, grinding, splitting and suitable combinations thereof. Any other satisfactory separating techniques can be used.

A ceramic memory can be formed of one or an array of such record media, viz., a plurality thereof. Instead of glazing an entire surface of a substrate, only selected regions can be glazed.

The switchability phenomena in both the electrical and optical modes appear to be a surface phenomena in that removal of the upper surface portion of the record medium, e.g., by slight abrasion, dissolving or scratching will deactivate the ability of record medium to switch between the low resistivity and high resistivity states and the corresponding distinct color states of copper and blue-green. This loss of switchability can be restored, however, by heating the deactivated surface regions at temperatures of about 500° C. to about 700° C., and more usually at temperatures of about 550° C. to about 650° C., e.g., about 600° C. for time periods ranging from about 30 minutes to 2 hours and more usually from about 45 minutes to about 1.5 hours, e.g., approximately 1 hour. One interesting observation encountered during the preparation of record media according to this invention is that both upper and lower surfaces of the aforementioned glaze can be rendered switchable. This can be accomplished by forming and firing the glaze as indicated above, removing the substrate by grinding or other means of removal and then heating the resulting lower glaze surface(s) at temperatures of about 500° C. to about 700° C., e.g., about 550° C. to about 650° C. for from about 1 to about 3 hours and more usually about 1.75 hours to about 2.25 hours, e.g., approximately 2 hours. Both the upper and lower surfaces of the record medium can then be switched back and forth thermally with the same ease between the write and erase states to yield substantially the same resistivity properties and optical properties. The provision of the upper and lower surfaces of the record medium with independent but uniform storage capabilities greatly enhances the storage capacity of the electro-optical record medium per unit weight.

The thickness of the glaze employed as the record medium in this invention can conveniently range from about 0.1 to about 2.0 millimeters and more usually from about 0.1 to about 1.5 millimeters, e.g., approximately one millimeter.

As noted above, the mole ratio of lead oxide to copper oxide used in preparing the record media can range from about 0.1 to about 12.0:1, usually ranges from about 0.25 to 5:1, more usually ranges from about 2 to about 5:1 and preferably ranges from about 3 to about 4:1. At mole ratios of about 1 to 2:1, a glaze is formed which is switchable; but the glaze is less uniform and less smooth than one having a ratio of about 3 to 4 moles of lead oxide per mole of copper oxide. Moreover, the copper colored (low resistivity) state of the glaze resulting from use of a 1 to 2:1 mole ratio of lead oxide to copper oxide has less uniform resistance than record media formed from about 3 to about 4 moles of lead oxide per mole of copper oxide. At mole ratios of 5 moles of lead oxide and greater per mole of copper oxide switchable record media are obtained but having slightly more resistivity in the write state than the 3 to 4:1 mole ratio mixtures. This does not detract substantially from the ability to distinguish electrically between the write and erase states.

A further advantage of this invention resides in the fact that the temperatures utilized for writing and erasing, respectively, offer a sufficient basis for differentiation to reduce error and inadvertent writing or erasure, respectively, even when erasure is conducted thermally, e.g., by use of elevated temperatures as compared with oxidizing agents at ambient temperatures. For example, writing is customarily conducted at temperatures of about 650° C. to about 850° C. whereas the usual erasure temperatures lie between about 150° C. and about 450° C. Thus, it can be seen that a usual temperature differential of approximately 200° C. exists between the temperatures employed to produce the write and erase states. At the lower erasing temperatures of about 150° C. and below, switching tends to be very slow, in some cases taking a matter of hours. The use of the higher erasure temperatures, e.g., 400° C. to 450° C. yields much faster (instantaneous) switching times measured in microseconds. Since the means of writing and erasing utilize the same form of energy (thermal) although at different levels; the present invention does not require maintenance of separate forms of energy to accomplish writing or erasure of information, respectively. No energy is required for storage. A variety of heat sources can be employed for switching, the prevailing considerations being the definition or resolution required, with laser beams giving finer definition and number of lines per lineal inch of record medium than torches. The use of laser beams to record and/or erase information in both the optical and electronic moles is preferred where high bit-packing densities and/or high optical-resolution characteristics are desired in the record medium which can be used as a display, ceramic memory, etc. Within the above context it will be realized that a variety of heat sources can be employed for the switching. Suitable heat sources include, but are not limited to the following: focused projection lamps (150 watt tungsten projection lamp), 500 watt quartz iodine lamps, torches, such as butane-oxygen torches, argon and other laser beams, e.g., ruby, carbon dioxide, etc. and any flame or other heating means capable of attaining the requisite temperatures for the purpose of writing and erasing, as the case may be.

When copper oxide was omitted from the glaze formulation and fired on conventional ceramic substrates, the resulting lead oxide glaze (fired at 925° C.) is optically switchable by heating with a torch but does not result in a medium suitable for storage of electrical information. This glaze was thermally switchable to produce a black coloration in the areas where the heat was applied by heating the selected areas to temperatures ranging from about 550° C. to about 700° C. Erasure was accomplished readily at lower temperatures to produce a yellow colored state by subjecting the previously blackened areas to temperatures of about 425° C. to about 500° C. This lead-oxide optical storage and write-erase record medium did not possess the electrical properties referred to hereinabove with respect to the lead oxide - copper oxide containing record media of this invention.

The present invention will be described in great detail in the examples which follow. These examples are included herein as illustrative of the present invention and are not intended to be limiting thereon.

EXAMPLE I — TYPICAL PROCEDURE FOR PREPARING RECORD MEDIUM

In preparing a $PbO$-$Cu_2O$ glaze, reagent grade $Pb0$ and $Cu_20$ chemicals are used. Amounts of these chemicals used for a certain glaze depend on the mole ratio of $Pb0$ to $Cu_20$ desired. For example, for a $Pb0$:$Cu_20$::4:1 mixture 44.6 g of $Pb0$ and 7.2 g of $Cu_2O$ are used; for a 2.1 mixture 22.3 g of PbO and 7.2 g of $Cu_2$ are used. The oxides are weighed in a 4:1 mole ratio and ground together with a mortar and pestle. The material is then thoroughly mixed and ground for about six hours using a ball mill.

This mixture is spread evenly over a magnesia-alumina-silicate ceramic tile substrate composed of $2MgO \cdot 2Al_2O_3 \cdot 5SiO_2$. This coated tile is then fired in a furnace to 1,200° C. During the firing, the temperature is raised slowly and the coated substrate reaches the required firing temperature in approximately 7 hours. The temperature is then held at 1,200° C. for approximately one-half hour after which the furnace is cooled slowly. The record medium is cooled to room temperature over approximately a 24 hour period.

EXAMPLE II — THERMAL SWITCHING OF RECORD MEDIA AND FINENESS OF RESOLUTION

Using the procedure described in Example I, the resulting record medium is a smooth, dark-colored glaze. The surface thereof can be thermally switched ("write" ) to a copper color. One method of thermal switching is to heat the surface of the glaze with the flame of a butane gas-oxygen torch. When the sample is heated to the required temperatures (600° C. to 900° C.) and the reducing portion of the torch flame is brought into contact with the sample, the surface of the glaze will switch to a copper color. Then the flame is quickly removed allowing the copper color to remain. Once the material is switched to the copper colored state it is stable therein. The torch can also be used to switch from the copper colored state to a blue-green ("erase" ) colored state. At the proper temperatures (150° C. to 550° C.) the glaze record medium switches from the copper color to a blue-green color. This blue-green colored state can be switched back to the copper colored state in the manner described above. In addition to the visible change in color, the two different states show the large difference in resistivity which has been described previously.

The record medium can be switched to the two different states by other procedures also. One method is to heat the record medium to the requisite temperatures in a furnace and immediately plunge it into alcohol, ether, acetone or other similar solvents which can act as reducing agents. An alternative is to suspend the heated record medium in gaseous solvent (vapors). A further satisfactory method for switching to the copper state is by using a laser beam to heat the surface of the record medium in the presence of one or more of the above-mentioned reducing agents.

The copper state is switched to the blue-green state at the time desired by heating the sample in a furnace or on a hot plate to the temperature required for this switching process. At lower temperatures (150° – 200° C.) the switching takes a long period of time while at higher temperatures (500° – 600° C.) the switch is accomplished within a few seconds.

The use of a torch as a heat source for switching the glaze is satisfactory for displays where the fineness of resolution of line can be measured in millimeters or larger as the area switched depends upon the size of the torch used which in turn will regulate the size and area of the flame used in the switching process. Hence, the smallest line width attainable practically with most torches is measured in millimeters. Much finer line widths have been obtained when switching the sample with a laser beam. Using a laser beam as a heat source to switch the sample to the copper colored state, the usual line width obtained is 100–150 microns although line widths as narrow as 75–80 microns have been obtained.

EXAMPLE III — EFFECT OF THERMAL HISTORY DURING RECORD MEDIUM FORMATION UPON SWITCHING CHARACTERISTICS

A study of a PbO-$Cu_2O$ (4:1 mole ratio) glaze formulation fired at a fixed temperature for different periods of time has indicated that glazes fired for short periods of time as well as those fired for very long periods of time at 1,150° C. will not produce a switchable glaze. However, glazes fired for intermediate periods of time do produce switchable glazes.

A 4:1 mole ratio mixture of PbO to $Cu_2O$ was glazed onto a magnesia-alumina-silicate ceramic tile substrate (2 $MgO \cdot 2Al_2O_3 \cdot 5 SiO_2$) at 1,150° C. for periods of time ranging from 1 minute to 60 minutes. After the specified period of time, the sample was removed and cooled at room temperatures. Samples fired for 1, 2, 3, 4, 5 and 6 minutes form a dark, rough glaze that shows only a slight "writing" to the copper color when heated at switching temperatures with a torch. However, the longer the firing period, the greater the extent of copper color produced when the sample is tested for switching characteristics. No areas of high electrical conductivity are observed with these samples.

Examination of the switched samples with a microscope at a magnification of 100 times shows that small copper colored areas are cut off and isolated by areas of dark color. As the firing time is increased from 1 to 6 minutes, the copper colored areas do get larger.

Samples prepared by firing for 7, 8 and 9 minutes at 1,150° C. show a more pronounced copper coloration when switched and show some areas of high conductivity. That is to say, there are some parts on the surface that show a relatively large area of continuous conductivity while other parts do not. Examination with the microscope shows large areas of continuous copper coloration that are surrounded by dark colored areas. This results in "spotty" conductivity instead of the entire sample being highly conductive.

Samples prepared by firing for 10, 11, 12, 13, 14 and 15 minutes show a very pronounced copper coloration when switched and the entire surface area shows high conductivity. Examination of these samples with a microscope shows that the copper colored areas have completely merged together to form a continuous copper colored surface with no interrupting dark colored areas. Samples fired for 15, 20, 25 and 30 minutes all switch to a copper colored state when heated with the torch. However, as the firing time increases toward 30 minutes, the copper colored state of the switched samples becomes lighter. All of these samples show high conductivity in all areas of the glaze surface. Samples fired for 40, 50 and 60 minutes will switch only to an extremely light colored copper state. In addition, the copper colored state shows no conductivity at any place on the surface of the sample. Examination of these samples (fired 15 through 60 minutes) with a microscope shows that as they are fired for longer periods of time, the surface becomes smoother and the ability to form the copper coloration decreases.

EXAMPLE IV — PREPARATION OF A RECORD MEDIUM WHEREIN BOTH THE UPPER AND LOWER SURFACES ARE CAPABLE OF BEING SWITCHED

One desirable characteristic of the record medium is that when the glaze layer is separated from the substrate, the glaze can be treated to enable both sides thereof to be switched to a highly conductive copper colored state or to a highly resistive blue-green state. To prepare such a sample, the lead oxide - copper oxide glaze is formed on the ceramic tile substrate as described in Example I. The dark glaze layer (approximately 0.75 – 1.00 millimeters thick) is then removed from the substrate by sawing, cutting, grinding, sanding or combinations thereof. The glaze layer is ground down to approximately 0.50 millimeters thick from the back side (side previously bonded to the substrate) to remove any high concentrations of substrate-materials which diffuse into the glaze layer. This thin glaze layer is heated in a furnace at 600° C. for 1 hour and then cooled. At this point, the glaze layer can be switched to either state on either side. The abraided side is, of course, much rougher than the original surface side but this roughness can be removed by polishing the sample before heating it in the furnace using conventional ceramic polishing techniques.

EXAMPLE V — DEACTIVATION AND RESTORATION OF THE SWITCHABLE RECORD MEDIA

The surface of these record media can be deactivated for various purposes so that such deactivated region(s) will not switch to either of the two stable states. Lightly abraiding the surface of the sample regardless of what state it is in (original fired dark colored, copper-colored, or blue-green colored) by sanding, scratching or grinding will produce a dark colored surface that cannot be switched. The switching characteristics can be restored, however, by heating at 600° C. for about 1 hour.

The glaze record media surface can also be deactivated chemically by acids in concentrated form. Chemical deactivation of all three states is almost instantaneous with concentrated hydrochloric acid. The copper colored and blue-green colored states are immediately changed to a dark colored state by either the concentrated HCl liquid or HCl fumes. Concentrated Nitric acid also attacks and deactivates all three states of the record media although the deactivation takes a longer period of time. The record media are completely deactivated by either the liquid or the fumes of concentrated $HNO_3$ in approximately 10 to 12 minutes.

The record media are more inert toward concentrated sulfuric acid, however. Liquid $H_2SO_4$ will discolor the copper and blue-green colored states to a dark colored state in approximately 10 minutes. These two states are not discolored by concentrated $H_2SO_4$ fumes after one-half hour. In addition, after one-half hour in contact with liquid concentrated $H_2SO_4$, the discolored areas are not completely deactivated and can be switched back to a copper colored state or to a blue-green colored state by heating at 600° C. with a torch. However, the copper colored state does not show the high conductivity characteristics usually associated with this state.

Record media deactivated by treatment with concentrated HC1, $HNO_3$ and $H_2SO_4$, respectively, were then placed in a furnace and heated at 600° C. for 1 hour in an attempt to reactivate them. No reactivation occurred and the samples treated with concentrated HCl and $HNO_3$ would undergo no color change and although the sample treated with concentrated $H_2SO_4$ did switch thermally to a copper colored state but this state failed to exhibit the characteristic high conductivity.

A sample record medium was also treated with concentrated glacial acetic acid. After one-half hour, no apparent discoloration or deactivation of any of the three states by either the liquid or the fumes was noted. The colors as well as the resistivity of each state appeared to be the same as before the acid treatment.

EXAMPLE VI — ANALYSIS OF THE GLAZE LAYER INDICATING THE EXTENT OF PENETRATION OF SUBSTRATE INTO THE GLAZE LAYER

A 4:1 mole ratio mixture of PbO to $Cu_2O$ was fired onto magnesia-alumina-silicate ceramic tile substrates ($2MgO{\cdot}2Al_2O_3{\cdot}5SiO_2$) to form record media glazes by the method described in Example I. The glaze layer was mechanically removed from two different samples. One sample of the glaze layer was removed from the substrate at the boundary of the dark glaze and the white colored substrate. This layer was approximately 0.9 mm. thick and under visual examination none of the light colored substrate appeared to be in the dark glaze layer. The second sample was ground down further from the back side of the glaze previously bonded to the substrate. This sample was reduced to a thickness of 0.3 mm., viz., about one-third the thickness of the first sample.

Analysis of these two samples gave almost exactly the same results. Analysis for the cations Pb and Si was done by wet chemical methods and analysis for Cu, Mg and Al was done by atomic adsorption. The two analyses are as follows:

| | 1st Sample (0.9 mm. thick) | 2nd Sample (0.3 mm. thick) |
|---|---|---|
| Pb | 41.2% | 41.5% |
| Cu | 5.1 | 5.7 |
| Si | 9.3 | 9.3 |
| Al | 4.1 | 3.4 |
| Mg | 0.8 | 0.8 |

Trace amounts (less than 1%) of Fe, Cr, Ca, V, Sn, B, Mo and Ag were also determined to be present by emission spectroscopy.

It is evident that significantly large amounts of Si and Al are migrating into the glaze layer relative to the Mg and also that significantly more Si is found in the glaze layer compared to Al. The mole ratio of Mg to Al to Si in the original substrate is approximately 1:2.2:2.9 whereas subsequent to formation of the record medium the ratio is 1:5:12 in the record medium glaze layer. Regardless of the degree of migration of each species from the substrate, it is evident that the results of the two analyses do indicate uniform migration. Hence, it can be concluded that the degree of penetration of the substrate materials into the glaze layer is uniform throughout the glaze layer.

EXAMPLE VII — VARIATION OF RESISTIVITY WITH TIME AND TEMPERATURE DURING ERASURE

It has been indicated previously that the highly conductive copper colored state can be switched to the highly resistive blue-green colored state slowly at lower temperatures or quickly at the higher temperatures. At the lower switching temperatures a visible change in color of the sample can be observed with time. The sample changes from the copper color by transition to gold to red to blue to yellow-blue and finally to the dark blue-green color. In addition to the color change, there is also an accompanying change in resistivity with time.

For example, at a temperature of 170° C. there is an initial slow rise in resistivity, followed by a very rapid rise to a resistivity value of $10^5$ ohms/square at which point the value stays constant for a period of time. Thus, a group of five samples prepared as in Example I showed initial resistivity values ranging from 1 to 40 ohms/square and reached the higher resistivity values of approximately $10^5$ ohms/square in time periods varying from 30 to 125 minutes. Rapid increase in resistivity was noted over heating periods varying from 20 to 120 minutes. This apparent inconsistency in results may be due to the fact that the samples tested had been switched to the copper state with a gas torch. This method sometimes gives less uniform copper surfaces as it depends upon operator skill. Switching using a laser beam remedies this.

Regardless of the thermal switching technique employed, it should be noted that this record media of this invention can be switched to states having virtually an infinite variation of resistivity values. In addition, the switching process can be stopped at any point, and the resistivity of the sample will remain essentially constant.

As noted above, a gas-oxygen, e.g., methane or butane-oxygen torch, can be used for erasure. Erasure can be conducted at higher temperatures than those stated above even into the writing temperatures range, but the use of these higher temperatures is usually considered less desirable, e.g., due to higher costs involved. Alternatively, erasure can be conducted by wet chemical procedures using conventional oxidizing agents as mentioned hereinabove usually in the form of aqueous solutions.

What is claimed is:

1. A reversible yet optionally permanent, dual electro-optical record and storage medium bistable in both the optical and electrical modes and non-volatile in the electrical mode having high resistivity contrast in the electrical mode between the write and erase states, high optical resolution and contrast in the optical mode between the write and erase states and capable of high bit-packing density and thermal micro-recording and erasure comprising a fired ceramic glaze containing an intimate mixture of reducible lead oxide and reducible copper oxide as a major component and silica and alumina as minor components and wherein the mole ratio of lead (as lead oxide) to copper (as copper oxide) ranges from about 0.1 to about 12.0:1.

2. A medium as in claim 1 wherein said fired glaze includes magnesia as a minor component.

3. A medium as in claim 1 wherein a substantial portion of the lead oxide in selected areas of a major surface of said medium is present in the reduced form as lead.

4. A medium as in claim 3 wherein a substantial portion of the lead oxide in selected areas of an additional major surface of said medium is present in the reduced form as lead.

5. A medium as in claim 1 wherein a substantial portion of the copper oxide in selected areas of a major surface of the record medium is present in the reduced form as copper.

6. A medium as in claim 5 wherein a substantial portion of the copper oxide in selected areas of an additional major surface of the record medium is present in the reduced form as copper.

7. A medium as in claim 1 wherein the mole ratio of lead (as lead oxide) to copper (as copper oxide) ranges from about 2 to about 5:1.

8. A medium as in claim 7 wherein the mole ratio of lead (as lead oxide) to copper (as copper oxide) ranges from about 3 to about 4:1.

9. A method of preparing the record medium of claim 1 comprising mixing lead oxide and copper oxide in a mole ratio of about 0.1 to about 12.0:1 respectively, depositing said mixture on a ceramic substrate containing silica and alumina as essential components and firing said glaze at temperatures ranging from about 1,000° C. to about 1,400° C.

10. A method of writing and storing data areas in both optical and electrical modes comprising heating a preselected area(s) of the record medium of claim 1 to temperatures ranging from about 600° C. to about 900° C. in the presence of a reducing medium and removing said heat.

11. A method as in claim 10 wherein said writing is conducted at temperatures ranging from about 700° C. to about 800° C.

12. A method of erasing data areas stored in both optical and electrical modes in the medium of claim 1 by subjecting such data areas thereof sought to be erased to temperatures ranging from about 150° C. to about 550° C.

13. A method as in claim 12 wherein said erasure is conducted at temperatures ranging from about 250° C. to about 450° C.

14. A method of erasing data areas stored in both optical and electrical modes in the medium of claim 1 by contacting such data areas thereof sought to be erased with an oxidizing agent(s).

* * * * *